Sept. 28, 1926.
W. O. VIVARTTAS
BEARING SUPPORT
Filed April 21, 1926    2 Sheets-Sheet 1
1,601,273
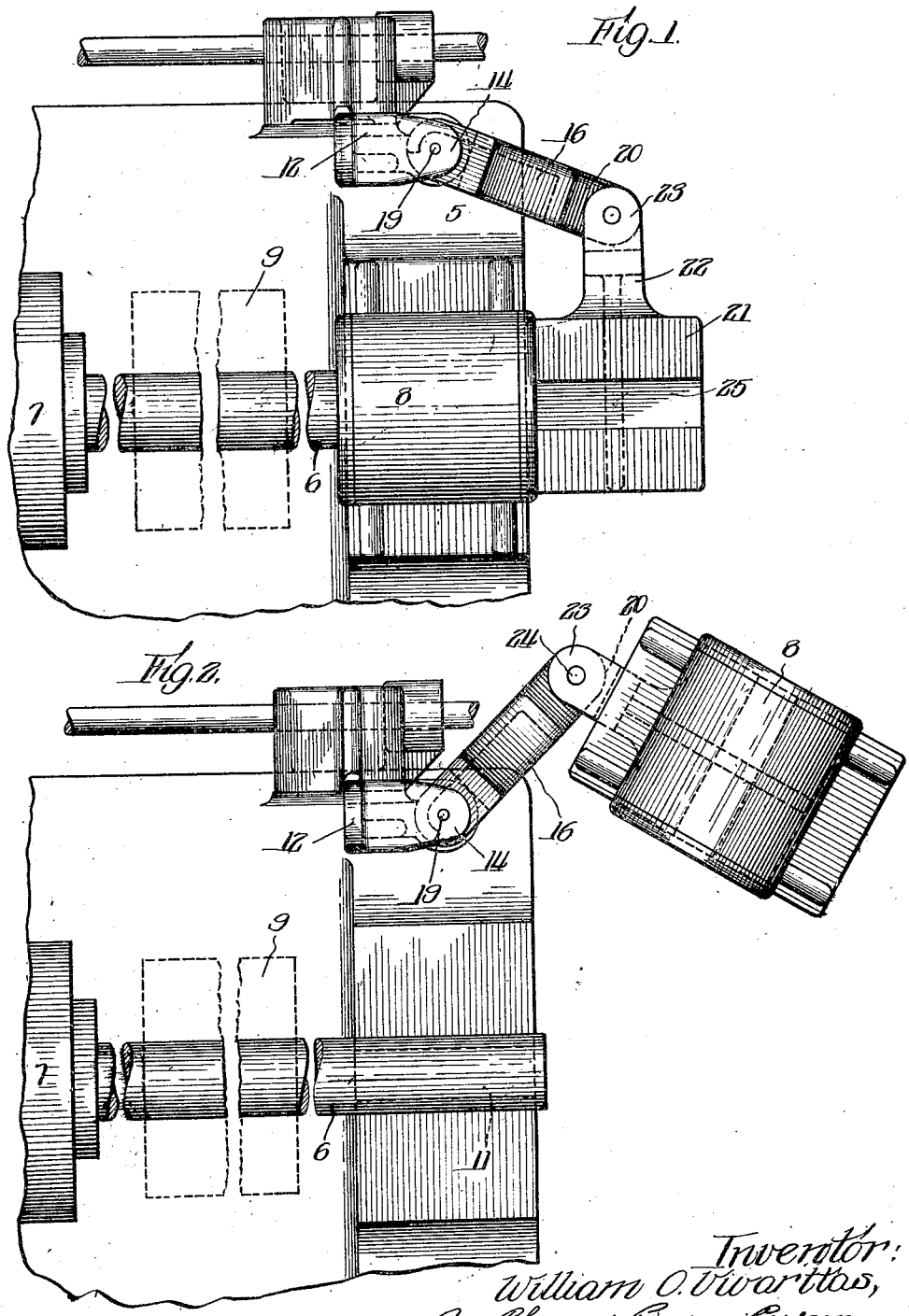

Sept. 28, 1926.
W. O. VIVARTTAS
1,601,273
BEARING SUPPORT
Filed April 21, 1926    2 Sheets-Sheet 2
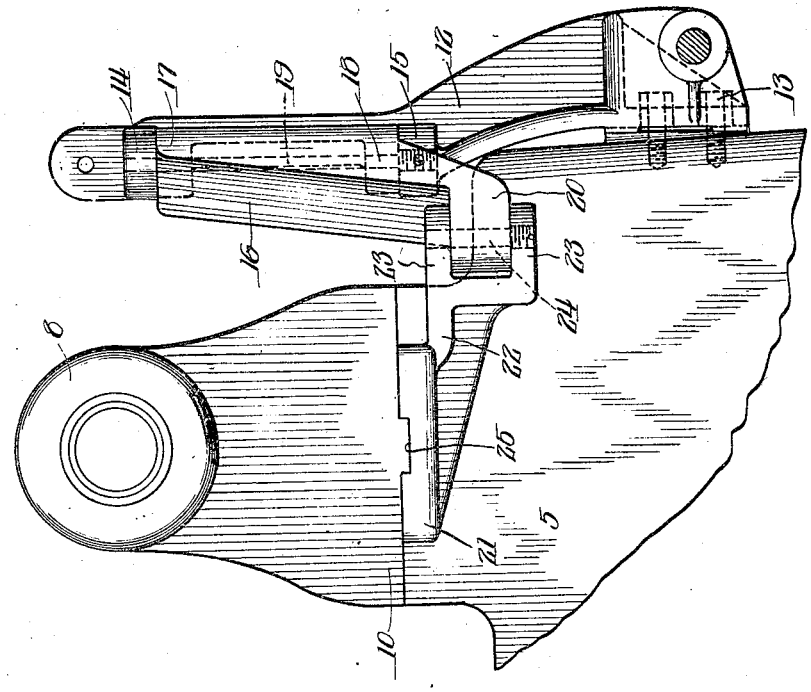
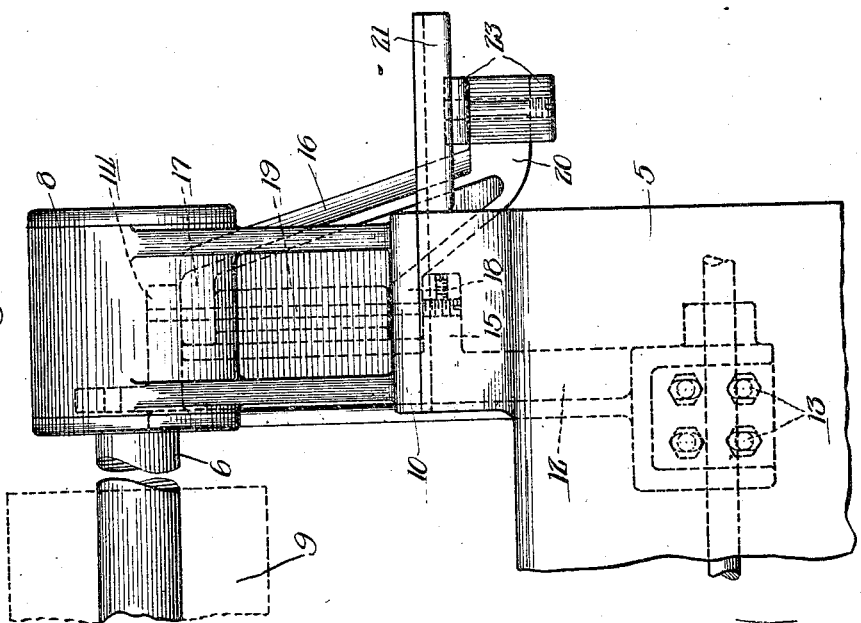
Inventor:
William O. Vivarttas,
By
attys.

Patented Sept. 28, 1926.

1,601,273

UNITED STATES PATENT OFFICE.

WILLIAM O. VIVARTTAS, OF ROCKFORD, ILLINOIS, ASSIGNOR TO MATTISON MACHINE WORKS, OF ROCKFORD, ILLINOIS, A CORPORATION OF ILLINOIS.

BEARING SUPPORT.

Application filed April 21, 1926. Serial No. 103,412.

This invention pertains to machine tools and more particularly to wood working machines such as moulders, planers, matchers, turning machines and the like.

The object of this invention is to provide a new and improved means for effectually supporting a detachable bearing for machine tool spindles whereby the bearing may be moved in a horizontal plane into and out of a normal operative position on the machine frame with a minimum of time and effort on the part of the operator, thereby increasing the speed of production.

Another object is to provide a novel and useful means adapted to receive a detachable bearing and swing it into an inoperative position which will obviate the use of a bearing support separate from the machine. A separate support tends to collect foreign matter which may be picked up by the bearing and included between the bearing and its normal support in replacing the bearing on the machine. By providing a support on the machine this difficulty is avoided and misalinement of the bearings, which would result from the inclusion of such foreign matter, is avoided.

A further object is to provide a support for a detachable bearing which, while accomplishing the foregoing objects, is also capable of being swung out of the way while the bearing is in its normal operative position.

Further objects and advantages will become apparent as the description proceeds.

While I have disclosed in the accompanying drawings a preferred embodiment of this invention, it is contemplated that various modifications and alternative constructions may be made by those skilled in the art without departing from the spirit and scope of the invention as expressed in the appended claims.

Referring to the drawings,

Figure 1 is a fragmentary plan view partially diagrammatic in character, showing a horizontal cutter head spindle with its removable bearing and the means which I have provided for movably supporting the bearing.

Fig. 2 is a similar view showing the movable bearing supported in inoperative position.

Fig. 3 is a fragmentary end view of the bearing in normal position.

Fig. 4 is a fragmentary side view of the bearing and support looking from the left of Fig. 3.

The frame of the machine, herein shown as a moulding machine, is generally designated by the numeral 5, and 6 indicates one of the horizontal cutter head spindles journalled at one end in a stationary bearing 7, and at its other end in a detachable bearing 8. A cutter head 9 is diagrammaticaly shown on the spindle.

The bearing 8 has upon its lower side a base portion 10 arranged to slide upon ways 11 formed upon the upper side of the frame 5 and extending transversely of the frame or, in other words, parallel to the axis of the spindle 6. In the normal operative position of the detachable bearing it is clamped in position upon the ways 11, any suitable clamping means being used for the purpose, and the free end of the spindle 6 is rigidly clamped to a bearing sleeve rotatable therein.

The means which has been provided for supporting the bearing 8 is such as to permit the bearing to be moved first axially out of engagement with the spindle and frame onto a shelf and thence to be swung horizontally to a position at one side of the spindle 6 which will permit the removal or replacement of the cutter head 9.

Referring particularly to Fig. 3, the preferred construction comprises an upstanding arm or bracket 12 secured at its lower end as by means of bolts 13 to the frame 5 of the machine at one side of the spindle 6. Formed upon the upper end of the bracket 12 at its outer side, is a pair of vertically spaced lugs 14 and 15 having alined openings. A short arm or link 16 is positioned at one end between said lugs, and is provided with similar lugs 17 and 18 having alined openings registering with the first mentioned openings. The link is pivoted on a shaft 19 extendng through these openings.

As best shown in Fig. 4, the link 16 in its preferred construction is in the form of a triangle, roughly obtuse in character, the sides of which are connected by a web. The lugs 17 and 18 are formed at opposite ends of one side of this triangle. The other two sides converge downwardly and outwardly and merge into a horizontal lug 20 at a point below and at one side of the ways 11 upon the frame 5.

As a means to receive the bearing 8 when said bearing is moved out of engagement with the frame 5 and the spindle 6, I have provided a flat shelf 21 formed on its underside with a laterally projecting arm 22 having a pair of vertically alined ears 23 arranged to engage the horizontal lug 20 on the link 16. A pivot pin 24 connecting the lug 20 and the ears 23 permits horizontal swinging of the shelf 21 relative to the link 16. The upper surface of the shelf 21 includes a way 25 (Figs. 1 and 3) similar to the way 11 upon which the base portion 10 of the bearing 8 slides.

The assembly, including the bracket 12, the link 16, and the shelf 21, is so positioned on the machine frame 5 that the top of said shelf is level with the frame surface upon which the bearing 8 is normally positioned, and the ways 25 on said shelf are adapted to form a continuation of the ways 11 on said frame when said shelf abuts said frame.

It will be apparent that the above mentioned arrangement of the bracket, the link, and the shelf readily permits the shelf to be positioned in abutting relation to the frame. To remove the bearing 8, it is slid from its normal position upon the frame 5 onto the shelf 21 and thence is swung with the shelf laterally to a position at one side of the spindle which allows free access to the cutter head 9. After the bearing is returned to its normal position in operative relation with the spindle, the shelf may again be swung to one side out of the way.

Inasmuch as the bearing is at all times supported either by the frame or the shelf, it will be apparent that the bearing when removed from the spindle will not collect foreign matter from other sources and will keep clean, thus preventing such matter from being carried to the ways, and insuring that when the bearing is clamped in operative position it will be in true alinement with the opposite bearing.

I claim as my invention:

1. A machine tool having, in combination, a spindle, a removable bearing adapted to support said spindle, a frame having ways for supporting said bearing when in its normal operative position on said spindle, a fixed support on said frame, a shelf having ways adapted to support said bearing, and a link pivotally connecting said shelf to said fixed support, said link permitting movement of said shelf to position the ways thereon adjacent to said ways on said frame, so as to permit the transfer of said bearing from one of said ways to the other, or to position said shelf with or without said bearing thereon remote from said spindle.

2. A machine tool having, in combination, a spindle having a detachable bearing, a fixed support therefor, and a shelf movably mounted on said support, said shelf being movable into position to permit transfer of said bearing from said spindle to said shelf or from said shelf to said spindle and being movable with or without said bearing thereon into a position remote from said spindle.

3. A machine tool comprising, in combination, a detachable spindle bearing, means on which said bearing is normally supported, a stationary support at one side of the spindle, and means mounted on said support for lateral movement toward the axis of the spindle into position to receive said bearing from said first mentioned means, and away from the axis of the spindle to move said bearing into a position remote from said spindle.

4. A machine tool comprising, in combination, a spindle, a bearing therefor, a base or frame on which said bearing is removably mounted, and means for receiving and supporting said bearing when removed from said spindle and frame comprising a movably mounted support arranged to detachably receive said bearing and in its movement to carry said bearing to a position transversely spaced from the axial line of said spindle to permit access to the spindle, said support being disassociated from said bearing when the latter is in association with said spindle.

In testimony whereof, I have hereunto affixed my signature.

WILLIAM O. VIVARTTAS.